(12) United States Patent
Yang et al.

(10) Patent No.: US 8,143,579 B2
(45) Date of Patent: Mar. 27, 2012

(54) RESISTIVE MATERIAL FOR BOLOMETER, BOLOMETER FOR INFRARED DETECTOR USING THE MATERIAL, AND METHOD OF MANUFACTURING THE BOLOMETER

(75) Inventors: Woo Seok Yang, Daejeon (KR); Sang Hoon Cheon, Daejeon (KR); Seong Mok Cho, Daejeon (KR); Ho Jun Ryu, Seoul (KR); Chang Auck Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/859,466

(22) Filed: Aug. 19, 2010

(65) Prior Publication Data
US 2011/0049366 A1 Mar. 3, 2011

(30) Foreign Application Priority Data

Sep. 2, 2009 (KR) .......................... 10-2009-0082675
Mar. 24, 2010 (KR) .......................... 10-2010-0026290

(51) Int. Cl.
*G01J 5/20* (2006.01)
(52) U.S. Cl. ..................................... 250/338.4
(58) Field of Classification Search .......... 250/330–335, 250/336.1–336.2, 338.1–338.5, 339.01–339.15, 250/340, 341.1–341.8
See application file for complete search history.

(56) References Cited

U.S. PATENT DOCUMENTS

| | | | |
|---|---|---|---|
| 3,950,645 A * | 4/1976 | Rotstein et al. ............... 250/352 |
| 4,968,886 A | 11/1990 | Wan et al. | |
| 5,286,976 A | 2/1994 | Cole | |
| 5,288,649 A | 2/1994 | Keenan | |
| 5,602,393 A * | 2/1997 | Gerard ........................ 250/338.4 |
| 5,854,587 A | 12/1998 | Horwitz et al. | |
| 6,313,463 B1 | 11/2001 | Cole et al. | |
| 7,180,077 B1 * | 2/2007 | Farhoomand ............... 250/338.4 |
| 7,629,582 B2 * | 12/2009 | Hoffman et al. ......... 250/339.01 |
| 2001/0028034 A1 * | 10/2001 | Sasaki ........................ 250/338.1 |
| 2004/0232337 A1 * | 11/2004 | Vilain ........................ 250/338.1 |
| 2005/0205786 A1 * | 9/2005 | Katagiri et al. ............. 250/336.2 |
| 2009/0146058 A1 | 6/2009 | Ryu et al. | |

FOREIGN PATENT DOCUMENTS

| | | |
|---|---|---|
| JP | 2001-203399 A | 7/2001 |
| JP | 2002-284529 | 10/2002 |
| JP | 2006-156886 | 6/2006 |

(Continued)

OTHER PUBLICATIONS

Beensh-Marchwicka et al., "Evaluation of pulse magnetron sputtered Ge films doped with antimony for sensors application," 2001, Sensors and Actuators B, vol. 76, pp. 361-365.*

(Continued)

*Primary Examiner* — Kiho Kim (57) ABSTRACT

A resistive material for a bolometer, a bolometer for an infrared detector using the material, and a method of manufacturing the bolometer are provided. In the resistive material, at least one element selected from the group consisting of nitrogen (N), oxygen (O) and germanium (Ge) is included in antimony (Sb). The resistive material has superior properties such as high temperature coefficient of resistance (TCR), low resistivity, a low noise constant, and is easily formed in a thin film structure by sputtering typically used in a complementary metal-oxide semiconductor (CMOS) process, so that it can be used as a resistor for the bolometer for an uncooled infrared detector, and thus provide the infrared detector with superior temperature precision.

20 Claims, 8 Drawing Sheets

FOREIGN PATENT DOCUMENTS

| | | | |
|---|---|---|---|
| KR | 1020010028525 A | 4/2001 | |
| KR | 1020060074992 A | 7/2006 | |
| KR | 1020090059799 A | 6/2009 | |
| KR | 1020090081302 A | 7/2009 | |

OTHER PUBLICATIONS

Hojun Ryu et al., "Sputtered silicon antimony thin film for the infrared detection layer of microbolometer", IEEE Sensors 2008 Conference, 2008, pp. 301-304, IEEE.

Myung-Ho Kwon et al., "Investigations of reactively sputtered $TiO_{2-\delta}$ films for microbolometer applications", Electro-Optical and Infrared Systems: Technology and Aplications V, 2008, pp. 711306-1-10, vol. 7113, SPIE, Daejeon, Korea.

P.C. Shan et al., "Investigation of semiconducting YBaCuO thin films: A new room temperature bolometer", Journal of Applied Physics, Dec. 15, 1996, pp. 7118-7123, vol. 80, No. 12, American Institute of Physics.

M.V.S. Ramakrishna et al., "Performance of Titanium and Amorphous Germanium Microbolometer Infrared Detectors", SPIE, pp. 415-420, vol. 3666, 1999.

E. Mottin et al., "Uncooled amorphous silicon technology enhancement for 25µm pixel pitch achievement", Infrared Technology and Applications XXVIII, 2003, pp. 200-207, vol. 4820, SPIE.

* cited by examiner

RESISTIVE MATERIAL FOR BOLOMETER, BOLOMETER FOR INFRARED DETECTOR USING THE MATERIAL, AND METHOD OF MANUFACTURING THE BOLOMETER

CROSS-REFERENCE TO RELATED APPLICATION

This application claims priority to and the benefit of Korean Patent Application No. 10-2009-0082675, filed Sep. 2, 2009 and Korean Patent Application No. 10-2010-0026290, filed Mar. 24, 2010, the disclosure of which is incorporated herein by reference in its entirety.

BACKGROUND

The present invention relates to a resistive material for a bolometer, a bolometer for an infrared detector using the material, and a method of manufacturing the bolometer. More specifically, the present invention relates to a bolometer for an infrared detector, which uses an antimony-based compound as a resistive material and applies the compound to a resistor, thereby making it possible to measure temperature with high precision, and a method of manufacturing the same.

DISCUSSION OF RELATED ART

Infrared (IR) detectors are classified into a photon type and a thermal type according to its operating principle. The photon-type IR detector is a cooled type that operates at liquid nitrogen temperature, while the thermal-type IR detector is an uncooled type that operates at room temperature.

The photon-type IR detector detects electron-hole pairs generated when a semiconductor material having a narrow band gap, such as mercury cadmium telluride (HgCdTe), mainly absorbs mid-wave IR of 3 µm to 5 µm, similarly to a photoconductor, photodiode, or photocapacitor.

In contrast, the thermal-type IR detector detects a change in temperature caused by heat generated when absorbing long-wave IR of 8 µm to 12 µm in a thermoelectric, pyroelectric or bolometric manner. Although the thermal-type IR detector is low in precision for detecting IR compared to the photon-type IR detector, it require no cooling device, which leads to a small size, low power consumption, and a low price. As a result, the thermal-type IR detector is widely applied.

Among the thermal-type IR detectors, bolometers are better in precision for temperature measurement than thermopiles, which are thermoelectric, and require no incidental device such as a chopper, unlike pyrometers, which are pyroelectric. For these reasons, the bolometers are most widely used.

The bolometers detect an increase in temperature caused by IR absorption of an object as a change in resistance. Here, if the object is made of a metal, the resistance increases in response to the temperature increase. If the object is made of a semiconductor, the resistance decreases in response to the temperature increase. As materials used for the bolometers, metals such as titanium (Ti) are sometimes used, but semiconductors such as amorphous silicon (a-Si), vanadium oxide ($VO_x$), and titanium oxide ($TiO_x$) are mainly used, because the semiconductors have a higher temperature coefficient of resistance (TCR) than the metals, and thus are suitable for resistive materials for bolometers.

The good resistive materials for high-quality bolometers must have properties such as low resistivity, a low noise constant, compatibility with processes for a complementary metal-oxide semiconductor (CMOS), etc. in addition to a high TCR.

However, the previous resistive materials for the bolometers have disadvantages. For example, Ti has a disadvantage in that it has a very low TCR of 0.25%/K, and a-Si has an advantage in that it has a high TCR of 2.5%/K and can easily deposit stable thin films using plasma enhanced chemical vapor deposition typically used in semiconductor processes, and a disadvantage in that it has a high resistivity of 86 Ω·cm. Further, $VO_x$ has an advantage in that it has a high TCR of 3%/K and a low resistivity of 0.4 Ω·cm, and a disadvantage in that it requires specific equipment such as ion beam sputtering equipment and a sophisticated process in order to deposit stable thin films. $TiO_x$ has a disadvantage in that it has a TCR of 2.1%/K and a low resistivity of 1 Ω·cm, slightly lower than those of $VO_x$, and an advantage in that it can relatively easily deposit stable thin films using typical sputtering.

Other materials than the abovementioned resistive materials for the bolometers have been developed, but still face problems in that their properties such as compatibility with a CMOS process, ease and property stability of a thin film deposition process, etc. are poor. For example, $YBa_{0.4}Cu_{2.4}O_{4.6}$ has relatively superior properties in that a TCR is about 2.7%/K and resistivity is 8 Ω·cm, but has poor compatibility with a CMOS process. $La_{0.67}Sr_{0.33}MnO_\delta$, which is a type of $RE_xM_{1-x}Mn_yO_\delta$ (where RE is Y or a lanthanoid, and M is Ca, Sr, Ba, or Pb) has a high TCR of 4%/K, but poor compatibility with a CMOS process due to use of a LaAlO single crystal substrate and a high deposition temperature of 600° C.

As can be seen from the abovementioned results, although a-Si, $VO_x$, and $TiO_x$ are the most suitable for the resistive material for the bolometer among the numerous materials developed up to now, they fail to meet all the requirements. As such, there is still a need for a resistive material for the bolometer that meets the abovementioned requirements in the related field.

SUMMARY OF THE INVENTION

The present invention is directed to a new resistive material for a bolometer, which has superior properties.

Further, the present invention is directed to a bolometer for an infrared detector, in which a new resistive material for a bolometer, which has superior properties, is applied as a resistor.

The present invention is also directed to a method of manufacturing a bolometer for an infrared detector, in which a new resistive material for a bolometer, which has superior properties, is applied as a resistor.

One aspect of the present invention provides a resistive material for a bolometer, in which at least one element selected from the group consisting of nitrogen (N), oxygen (O) and germanium (Ge) is included in antimony (Sb). The Sb may be included at 20 at % or more.

The resistive material may include antimony nitride having a composition of $SbN_x$ ($0.03 \leq x \leq 0.25$), antimony oxide having a composition of $SbO_y$ ($0.02 \leq y \leq 0.15$), antimony oxynitride having a composition of $SbN_xO_y$ ($0.02 \leq x+y \leq 0.25$), or germanium antimony having a composition of $Ge_xSb$ ($0.1 \leq x \leq 0.8$).

The resistive material may further include a transition metal at 30 at % or less. The transition metal may include at least one selected from the group consisting of titanium (Ti), zirconium (Zr), hafnium (Hf), vanadium (V), niobium (Nb), tantalum (Ta), chromium (Cr), molybdenum (Mo), tungsten (W), manganese (Mn), iron (Fe), and cobalt (Co).

Another aspect of the present invention provides a bolometer for an infrared detector, which includes a resistor formed of a resistive material for a bolometer in which at least one element selected from the group consisting of N, O and Ge is included in Sb.

The resistor may have a resistance of 0.1 MΩ to 10 MΩ, and a temperature coefficient of resistance (TCR) of 2%/K or more, and include a thin film having a thickness of 50 nm to 100 nm.

The bolometer may further include: a semiconductor substrate in which a detection circuit is formed; a reflective layer formed on a part of a surface of the semiconductor substrate; metal pads formed on opposite sides of the reflective layer at a predetermined interval; and a sensor structure having the resistor located at an upper portion of the semiconductor substrate and spaced apart from a surface of the reflective layer. The sensor structure may be a multiple layer having the resistor surrounded with a protection layer, and include a body section located above the reflective layer, fixed sections mechanically and electrically connected to the metal pads outside the body section, and support arms connecting the body section with the fixed sections.

The sensor structure may include a protection layer, electrodes, and an absorbing layer formed on and under the resistor. The protection layer may be formed of silicon nitride ($Si_3N_4$). The electrodes and the absorbing layer may be formed of titanium nitride (TiN).

Still another aspect of the present invention provides a method of manufacturing a bolometer for an infrared detector. The method includes forming a resistor from a resistive material for a bolometer in the shape of a thin film using sputtering.

The method may further include: forming a reflective layer on a part of a surface of a semiconductor substrate in which a detection circuit is formed, and forming metal pads on opposite sides of the reflective layer at a predetermined interval; forming a sacrificial layer on a front surface of the semiconductor substrate, which includes the reflective layer and the metal pads, to a predetermined thickness; forming a sensor structure having the resistor on the sacrificial layer; and removing the sacrificial layer. The sputtering for forming the resistor may be reactive sputtering applying direct current (DC) or radio frequency (RF) power or co-sputtering using an independent target.

BRIEF DESCRIPTION OF THE DRAWINGS

The above and other objects, features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The present invention will be described more fully hereinafter with reference to the accompanying drawings, in which exemplary embodiments of the invention are shown. This invention may, however, be embodied in different forms and should not be construed as limited to the embodiments set forth herein.

In a resistive material for a bolometer according to exemplary embodiments of the present invention, at least one element selected from the group consisting of nitrogen (N), oxygen (O), and germanium (Ge) is included in antimony (Sb).

In the resistive material for the bolometer according to exemplary embodiments of the present invention, Sb may be included within a range of 20 at % or more.

In detail, the preferred resistive material is as follows:

(i) antimony nitride having a composition of $SbN_x$ ($0.03 \leq x \leq 0.25$);

(ii) antimony oxide having a composition of $SbO_y$ ($0.02 \leq y \leq 0.15$);

(iii) antimony oxynitride having a composition of $SbN_xO_y$ ($0.02 \leq x+y \leq 0.25$); or (iv) germanium antimony having a composition of $Ge_xSb$ ($0.1 \leq x \leq 0.8$).

Further, the resistive material for the bolometer according to exemplary embodiments of the present invention, in which at least one element selected from the group consisting of N, O, and Ge is included in Sb, may further include a transition metal at 30 at % or less. In this case, the transition metal may be selected from the group consisting of titanium (Ti), zirconium (Zr), hafnium (Hf), vanadium (V), niobium (Nb), tantalum (Ta), chromium (Cr), molybdenum (Mo), tungsten (W), manganese (Mn), iron (Fe), and cobalt (Co).

The resistive material for the bolometer according to exemplary embodiments of the present invention may be formed in the shape of a thin film, and used as a resistor for the bolometer of an infrared (IR) detector.

The resistive material for the bolometer according to exemplary embodiments of the present invention may be deposited in a thin film by sputtering. The sputtering includes reactive sputtering applying direct current (DC) or radio frequency (RF) power, or co-sputtering using an independent target to apply DC or RF power.

To deposit the thin film in which N and/or O is included in Sb, typical sputtering well known in this field may be used. Particularly, the reactive sputtering applying DC or RF power may be used. In detail, the thin film is deposited by injecting argon (Ar) gas with which $N_2$ and/or $O_2$ is mixed into a chamber, and applying DC or RF power to an Sb target.

To be used as the resistive material for the bolometer, the thin film may have a thickness of 50 to 100 nm, a resistivity of 0.5 to 100 $\Omega\cdot$cm, and a TCR of 2%/K or higher. To have these electrical properties, a composition of the thin film may be adjusted to $SbN_x$ ($0.03 \leq x \leq 0.25$), $SbO_y$ ($0.02 \leq y \leq 0.15$), or $SbN_xO_y$ ($0.02 \leq x+y \leq 0.25$).

Contents of $N_2$ and $O_2$ contained in the Sb thin film are adjusted by a ratio of the mixed gas, i.e. $N_2$/Ar, $O_2$/Ar, or $N_2+O_2$/Ar, when the thin film is deposited by the reactive sputtering. In the case of the same content, the resistivity is higher when $O_2$ is added rather than $N_2$. In this case, deposition conditions are as follows: an Ar gas flow of 20 to 40 sccm; an $N_2$ gas flow of 0 to 40 sccm; an $O_2$ gas flow of 0 to 20 sccm; a chamber pressure of 1 to 5 mTorr; a power applied to the Sb target of 1 to 3 W/cm$^2$; and a substrate temperature of 25 to 300° C.

The Sb thin film to which $N_2$ and $O_2$ are added may be subjected to effusion of the $N_2$ and $O_2$ added to the thin film to the outside in a subsequent heat-treatment process, and thus electrical properties may be degraded. To improve thermal stability of the Sb thin film to which $N_2$ and $O_2$ are added, Ge or at least one transition metal may be added at 30 at % or less. Here, the transition metal includes Ti, Zr, Hf, V, Nb, Ta, Cr, Mo, W, Mn, Fe, or Co.

Further, to deposit a thin film in which Ge is included in Sb, typical sputtering well known in this field may be used. Particularly, co-sputtering in which an Sb target and a Ge target are independently used may be used. In detail, the thin film is deposited by injecting Ar gas into a chamber, and independently applying DC or RF power to each of the Sb target and the Ge target. To be used as the resistive material for the bolometer, the thin film may have a thickness of 50 to 100 nm, a resistivity of 0.5 to 100 $\Omega\cdot$cm, and a TCR of 2%/K or higher. To have these electrical properties, a composition of the thin film may be adjusted to $Ge_xSb$ ($0.1 \leq x \leq 0.8$).

A content of Ge contained in the Sb thin film is adjusted by a ratio of power $P_{Ge}$ applied to the Ge target to power $P_{Sb}$ applied to the Sb target, i.e. $P_{Ge}/P_{Sb}$, when the thin film is deposited by co-sputtering. In this case, deposition conditions are as follows: an Ar gas flow of 20 to 40 sccm; a chamber pressure of 1 to 5 mTorr; a power applied to the Sb target of 1 to 3 W/cm$^2$; a power applied to the Ge target of 1 to 12 W/cm$^2$; and a substrate temperature of 25 to 300° C.

Figure 1:
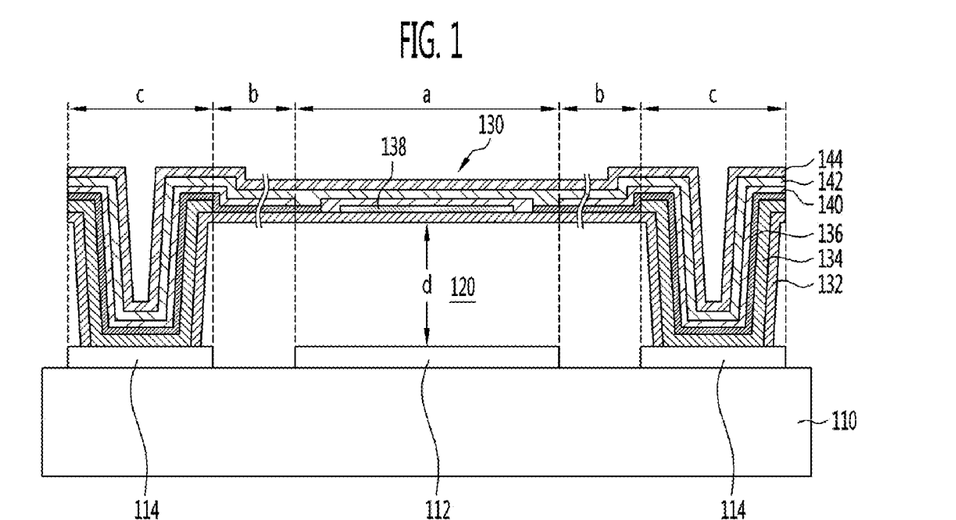
FIG. 1 is a cross-sectional view illustrating a bolometer for an IR detector according to an exemplary embodiment of the present invention.

FIG. 1 is a cross-sectional view of a bolometer for an IR detector according to an exemplary embodiment of the present invention.

Referring to FIG. 1, a bolometer for an IR detector according to an exemplary embodiment of the present invention includes a semiconductor substrate 110 in which a detection circuit is formed, a reflective layer 112 formed on a part of a surface of the semiconductor substrate 110, metal pads 114 formed on opposite sides of the reflective layer 112 at a predetermined interval, and a sensor structure 130 located at an upper portion of the semiconductor substrate 110 and spaced apart from a surface of the reflective layer 112. The sensor structure 130 includes a resistor 142 made of a thin film containing at least one element selected from the group consisting of N, O, and Ge in Sb, and includes a body section a located above the reflective layer 112, fixed sections c mechanically and electrically connected to the metal pads 114 outside the body section a, and support arms b connecting the body section a with the fixed sections c.

The semiconductor substrate 110 in which a detection circuit is formed may be formed of semiconductor silicon. The detection circuit formed in the semiconductor substrate 110 may generally include a complementary metal-oxide semiconductor (CMOS) circuit.

The reflective layer 112 on the semiconductor substrate 110 and the metal pads 114 spaced a predetermined distance from each other on the opposite sides of the reflective layer 112 may be formed of aluminum (Al). In this case, the metal pads 114 are connected with the detection circuit formed in the semiconductor substrate 110.

In the sensor structure 130 formed away from the reflective layer 112, a space 120 formed between the sensor structure 130 and the reflective layer 112 may be about a fourth of an IR wavelength $\lambda$.

The sensor structure 130 may be generally divided into one body section a, two support arms b, and two fixed sections c. The body section a has a structure in which a first insulating layer 132, electrodes 136 having an absorbing layer 138, a second insulating layer 140, a resistor 142, and a third insulating layer 144 are sequentially stacked. Further, each support arm b has a structure in which the first insulating layer 132, the electrodes 136, the second insulating layer 140, the resistor 142, and the third insulating layer 144 are sequentially stacked. Each fixed section c has a structure in which the first insulating layer 132, auxiliary electrodes 134, the electrodes 136, the second insulating layer 140, the resistor 142, and the third insulating layer 144 are sequentially stacked. The fixed sections c are mechanically and electrically connected with the metal pads 114 formed on the semiconductor substrate 110.

In detail, the body section a is disposed with the space 120 formed on the reflective layer 112. The fixed sections c are formed on the respective metal pads 114. The support arms b are disposed with the space 120 formed between the reflective layer 112 and the metal pads 114, and connect the body section a with the fixed sections c.

The space 120 serves to absorb IR to the maximum extent, and the wavelength $\lambda$ for determining a height of the space 120 is an IR wavelength of 8 to 12 $\mu$m.

The first, second and third insulating layers 132, 140 and 144 may be formed of silicon nitride ($Si_3N_4$). The first insulating layer 132 may have a thickness of 50 to 100 nm, and each of the second and third insulating layers 140 and 144 may have a thickness of 20 to 70 nm.

The auxiliary electrodes 134 may be formed of Al to have a thickness of 100 to 300 nm.

The electrodes 136 may be formed of titanium nitride (TiN) to have a thickness of 10 to 30 nm. The absorbing layer 138 may be formed of TiN, and have a thickness of 10 to 30 nm to have a sheet resistance of 377±200 ohm/sq so as to maximize absorption of IR.

The resistor 142 may be formed in a thin film structure using the abovementioned resistive material for the bolometer according to an exemplary embodiment of the present invention, and have a thickness of 50 to 100 nm.

Figure 2:
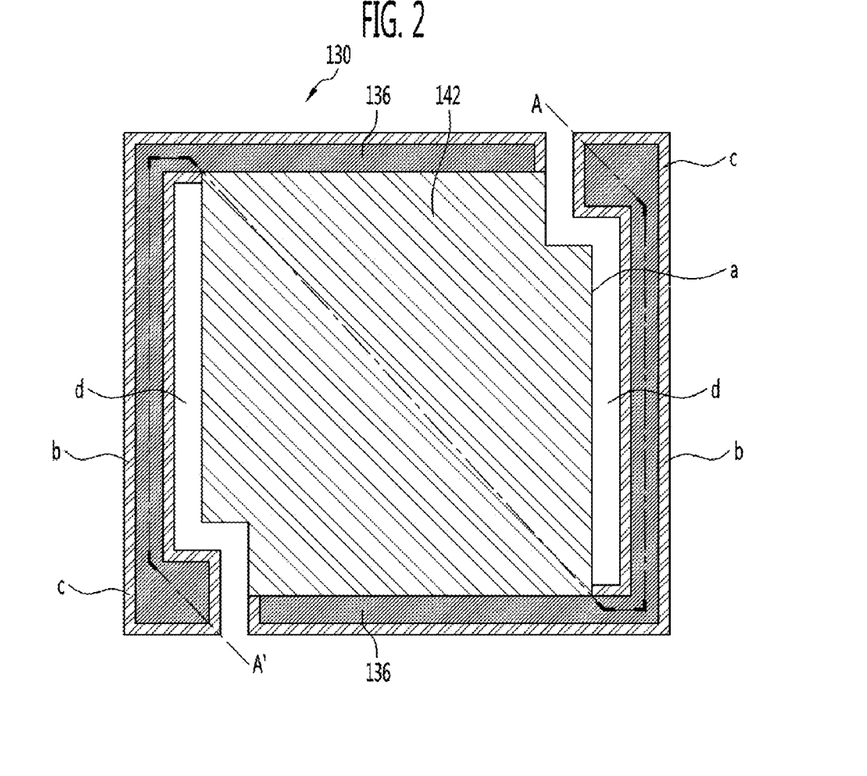
FIG. 2 is a plan view illustrating a bolometer for an IR detector according to an exemplary embodiment of the present invention.

FIG. 2 is a plan view of a bolometer according to an exemplary embodiment of the present invention.

Referring to FIG. 2, the sensor structure 130 is divided into one body section a, two support arms b, and two fixed sections c. The body section a of the sensor structure 130 is fixed to the semiconductor substrate through the fixed sections c by the support arms b connected to opposite ends thereof. Here, the support arms b elongatedly extend from the body section a with a predetermined space d, and prevent heat generated when IR is absorbed into the body section a from leaking to the semiconductor substrate. When a temperature of the body section a is increased by absorption of the IR, resistance of the resistor 142 of the body section a is reduced. The reduction of the resistance is detected by the detection circuit inside the semiconductor substrate which is connected to two electrodes 136 formed on opposite ends of the resistor 142.

When taken along line A-A' of FIG. 2, this becomes the cross-sectional view of FIG. 1.

A method of manufacturing a bolometer according to an exemplary embodiment of the present invention includes forming a reflective layer on a part of the surface of a semiconductor substrate in which a detection circuit is formed, forming metal pads, which are spaced a predetermined distance from each other, on opposite sides of the reflective layer, forming a sacrificial layer having a thickness of a fourth of an IR wavelength λ on a front surface of the semiconductor substrate including the reflective layer and the metal pads, forming a sensor structure, which is formed of a thin film where at least one element selected from the group consisting of N, O, and Ge is included in Sb, on the sacrificial layer, and removing the sacrificial layer.

FIGS. 3A through 3I are schematic views illustrating processes of manufacturing a bolometer for an IR detector according to an exemplary embodiment of the present invention.

Figure 3A:
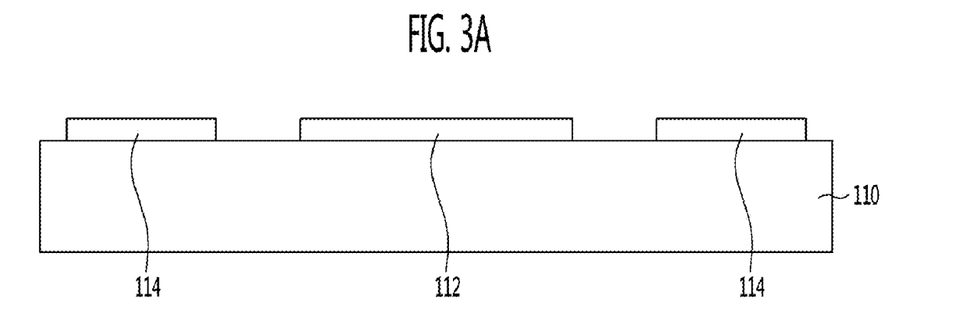
FIGS. 3A through 3I are schematic views illustrating processes of manufacturing a bolometer for an IR detector according to an exemplary embodiment of the present invention.

Referring to FIG. 3A, a silicon substrate 110 in which a CMOS detection circuit (not shown) is included is prepared. Then, a reflective layer 112 and metal pads 114 spaced a predetermined distance from the reflective layer 112 in opposite directions are simultaneously formed on the substrate 110. The reflective layer 112 and the metal pads 114 are formed of a material such as Al having high surface reflectivity and conductivity. Here, the metal pads 114 are electrically connected with the detection circuit.

Figure 3B:
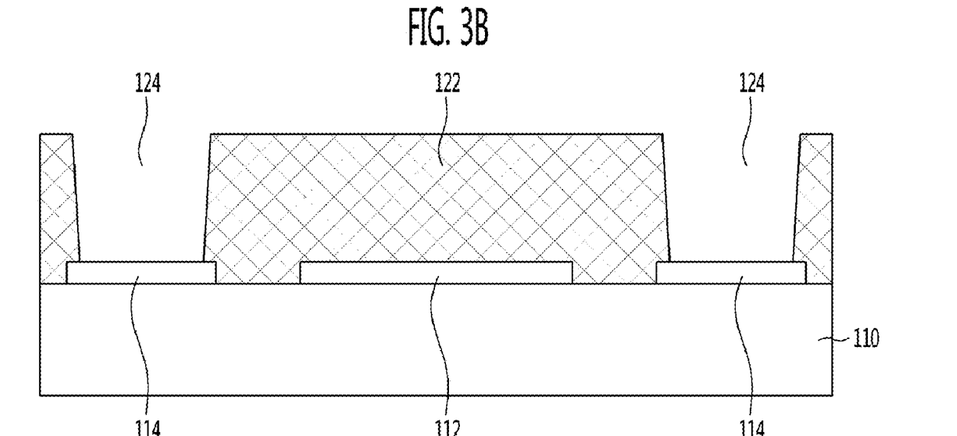

Referring to FIG. 3B, a sacrificial layer 122 is formed on the substrate 110, and holes 124 exposing the metal pads 114 are formed by partially etching the sacrificial layer 122. The sacrificial layer 122 is formed by performing spin-coating to have a thickness d corresponding to λ/4 (where λ is the IR wavelength) and is then cured at a temperature of 300 to 350° C. The IR wavelength λ ranges from 8 μm to 12 μm.

With reference to FIGS. 3C through 3H, the operation of forming the sensor structure 130 will be described in detail.

Figure 3C:
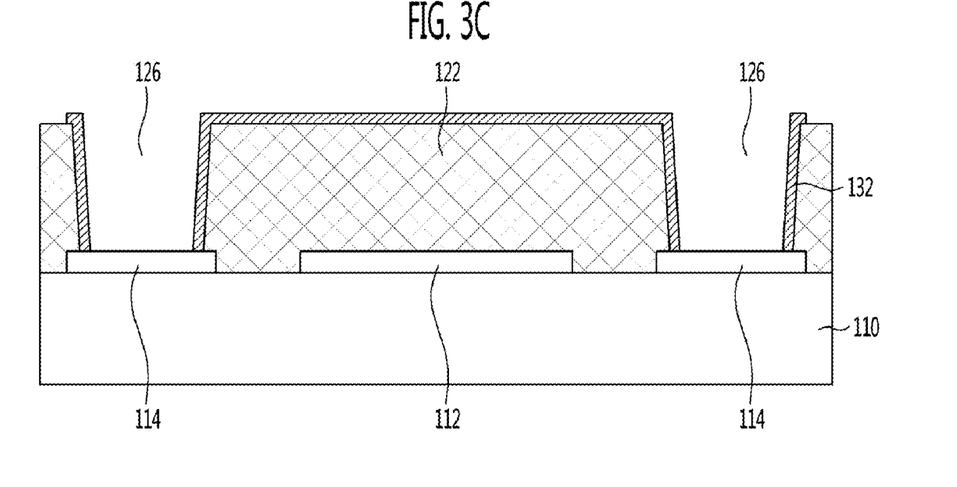

Referring to FIG. 3C, a first insulating layer 132 is formed on the sacrificial layer 122 and the holes 124 using silicon nitride ($Si_3N_4$), and is partially etched to expose the metal pads 114, so that holes 126 are formed.

Figure 3D:
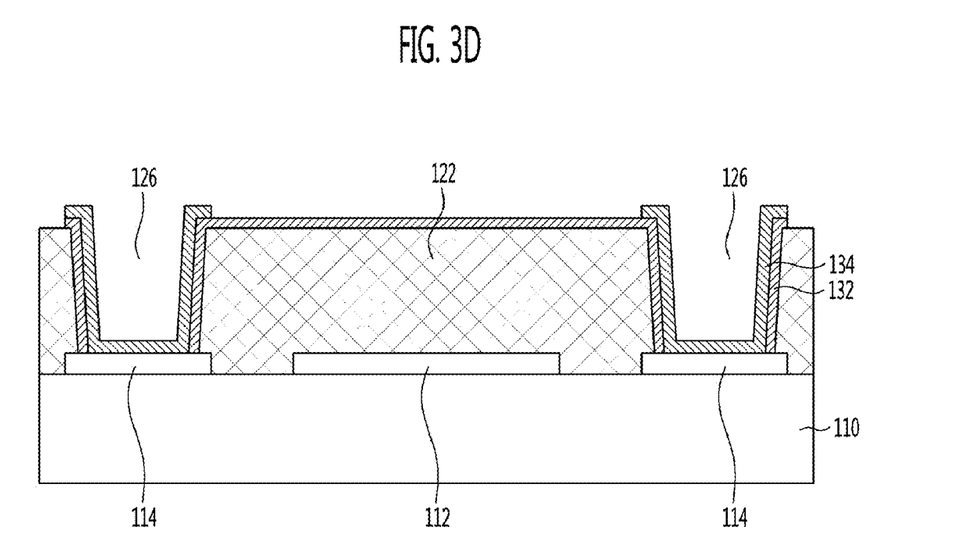

Referring to FIG. 3D, auxiliary electrodes 134 are formed in the holes 126 using Al, and are electrically connected with the metal pads 114.

Figure 3E:
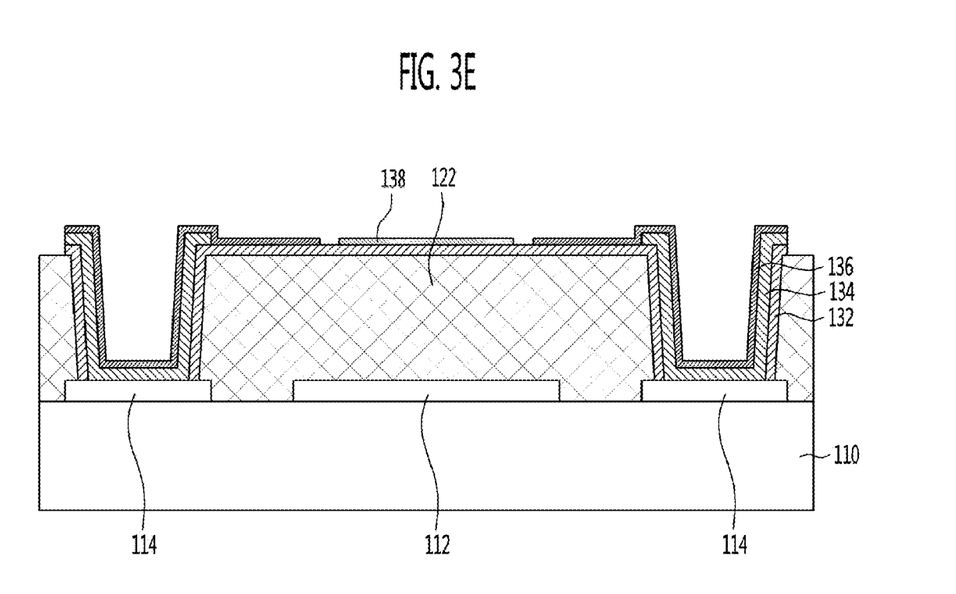

Referring to FIG. 3E, electrodes 136 and an absorbing layer 138 are simultaneously formed of titanium nitride (TiN). Here, the electrodes 136 are electrically connected with the auxiliary electrodes 134, but separated from the absorbing layer 138.

Figure 3F:
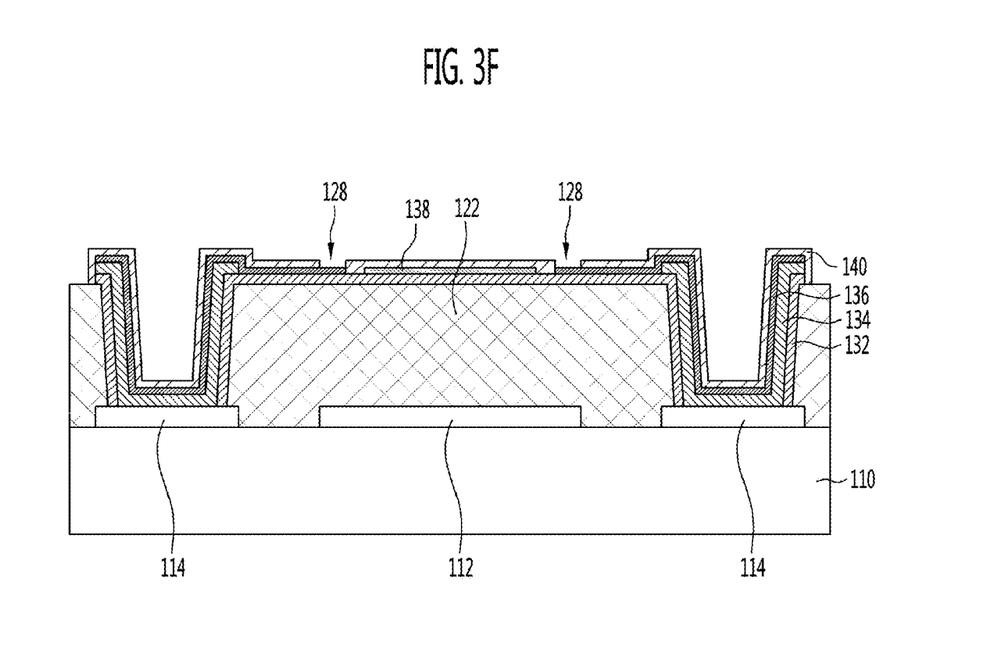

Referring to FIG. 3F, a second insulating layer 140 is formed of silicon nitride ($Si_3N_4$), and is partially etched to expose the electrodes 136, so that holes 128 are formed.

Figure 3G:
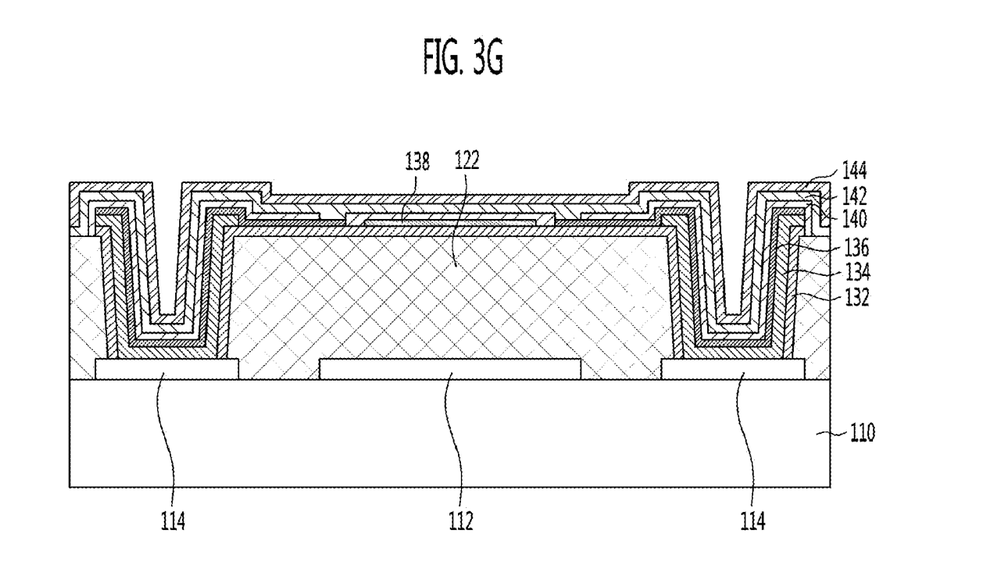

Referring to FIG. 3G, a resistor 142 and a third insulating layer 144 are sequentially formed. Here, the resistor 142 is formed by direct current (DC) or radio frequency (RF) sputtering using a resistive material where at least one element selected from the group consisting of N, O, and Ge is included in Sb. The third insulating layer 144 is formed of silicon nitride ($Si_3N_4$) by plasma enhanced chemical vapor deposition (PECVD).

Figure 3H:
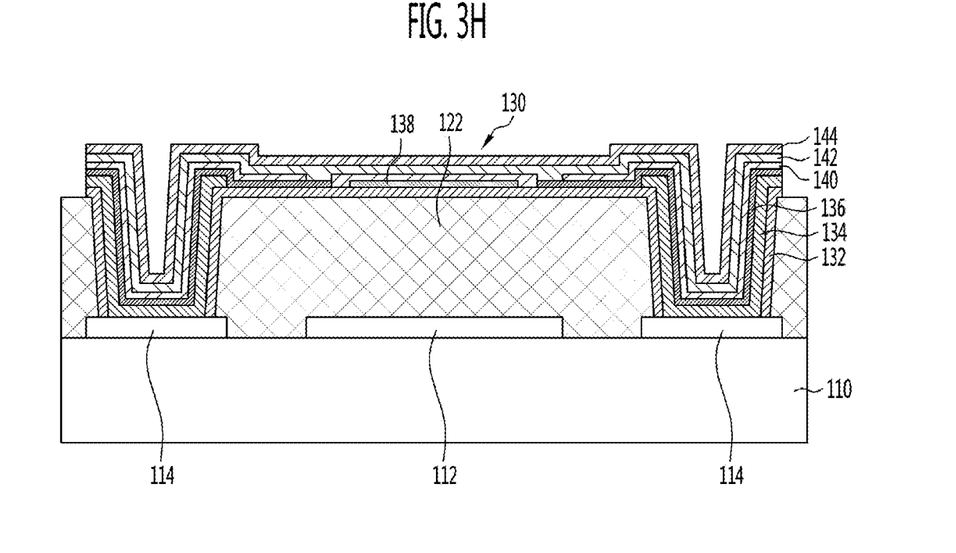

Referring to FIG. 3H, a multiple layer constituted of the third insulating layer 114, the resistor 142, the second insulating layer 140, and the first insulating layer 132 is etched all at once to form a body section and support arms of the sensor structure 130. Here, the multiple layer where the silicon nitride ($Si_3N_4$) insulating layers 132, 140 and 144 are formed under and on the resistor 142 is etched by reactive ion etching using a mixture of a gas including chlorine (Cl) (e.g. $BCl_3$, $Cl_2$, $CCl_4$) and a gas including fluorine (F) (e.g. $SF_6$, $CF_4$, $CHF_3$, $C_2F_2$, $CH_3F$).

As an example, the multiple layer of the resistor and the silicon nitride insulating layer is etched by injecting a mixture of 10 sccm of $BCl_3$, 70 sccm of $SF_6$, and 20 sccm of $N_2$, into a chamber, adjusting a pressure to 30 mTorr, and applying an RF power of 2 W/cm².

Figure 3I:
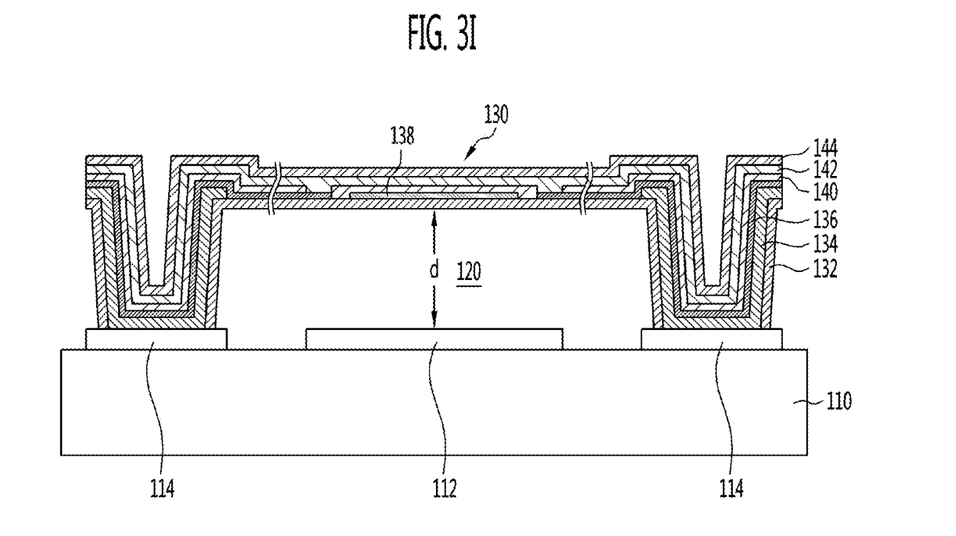

Referring to FIG. 3I, the sacrificial layer 122 is removed by plasma ashing using a mixture including oxygen ($O_2$) gas. Thus, the body section of the sensor structure 130 is spaced apart from the reflective layer 112 by a space 120 corresponding to the thickness d of the sacrificial layer 122.

After the deposition of the resistor, resistance may vary in a heat-treatment process. The variation in resistance induces nonuniform properties of the bolometer, and thus must be minimized. To this end, the processes after the deposition, i.e. the processes shown in FIGS. 3G through 3I, may be performed at 200° C. or less.

Embodiments 1 Through 10

Sb thin films to which N and/or O was added were each deposited to a thickness of 80 to 120 nm on a silicon single crystal substrate, on which a silicon nitride ($Si_3N_4$) layer was formed to a thickness of 100 nm, and then resistivity and TCR properties were measured. The Sb thin films were deposited by reactive sputtering injecting Ar gas with which nitrogen ($N_2$) gas and/or oxygen ($O_2$) gas was mixed into a chamber, and applying DC power to an Sb target. The properties of the thin films were examined according to sputtering conditions, and are arranged in Table 1 below

TABLE 1

| | Sputtering Conditions | | | | Thin Film Properties | | |
|---|---|---|---|---|---|---|---|
| Sample No. | Gas flow (sccm) | Pressure (mTorr) | Temperature of Substrate (° C.) | DC Power (W) | Composition* (at %) | Resistivity (Ω · cm) | TCR (%/K) |
| 1 | $O_2$/Ar = 5/25 | 2.9 | 150 | Sb = 100 | — | 1.28 | 2.83 |
| 2 | $O_2$/Ar = 8/25 | 3.1 | 150 | Sb = 100 | — | 9.66 | 3.19 |
| 3 | $O_2$/Ar = 8/25 | 3.1 | 25 | Sb = 100 | — | 6.75 | 3.15 |
| 4 | $N_2$/Ar = 20/20 | 3.4 | 300 | Sb = 100 | Sb:N = 95:5 | 7.81 | 2.91 |
| 5 | $N_2$/Ar = 10/25 | 3.3 | 150 | Sb = 100 | — | 1.98 | 3.21 |
| 6 | $N_2$/Ar = 15/25 | 3.6 | 150 | Sb = 100 | Sb:N = 91:9 | 9.39 | 3.38 |
| 7 | $N_2$/Ar = 15/25 | 3.5 | RT | Sb = 100 | Sb:N = 94:6 | 16.9 | 3.55 |

TABLE 1-continued

| | Sputtering Conditions | | | | Thin Film Properties | | |
|---|---|---|---|---|---|---|---|
| Sample No. | Gas flow (sccm) | Pressure (mTorr) | Temperature of Substrate (° C.) | DC Power (W) | Composition* (at %) | Resistivity ($\Omega \cdot$ cm) | TCR (%/K) |
| 8 | $O_2/N_2/Ar = 6/12/20$ | 3.2 | 300 | Sb = 100 | (Sb + O):N = 96:4 | 68.6 | 3.47 |
| 9 | $O_2/N_2/Ar = 4/7/25$ | 3.4 | 150 | Sb = 100 | — | 7.10 | 3.29 |
| 10 | $O_2/N_2/Ar = 3/6/25$ | 3.2 | 25 | Sb = 100 | (Sb + O):N = 93:7 | 5.45 | 3.16 |

*Due to attribute of an analysis method (X-ray photoelectron spectroscopy (XPS)), amounts of Sb and O could not be measured individually, but only in total.

Embodiments 11 Through 17

Sb-based thin films in which Ge or Ti was added to Sb thin films to which N and/or O was added were each deposited to a thickness of 110 to 150 nm on a silicon single crystal substrate, on which a silicon nitride ($Si_3N_4$) layer was formed to a thickness of 100 nm, and then resistivity and TCR properties were measured. The Sb-based thin films were deposited by reactive co-sputtering injecting Ar gas with which nitrogen ($N_2$) gas and/or oxygen ($O_2$) gas was mixed into a chamber, and independently applying DC power to an Sb target and a Ge or Ti target. The properties of the thin films were examined according to co-sputtering conditions, and are arranged in Table 2 below Embodiment 24

Figure 4:
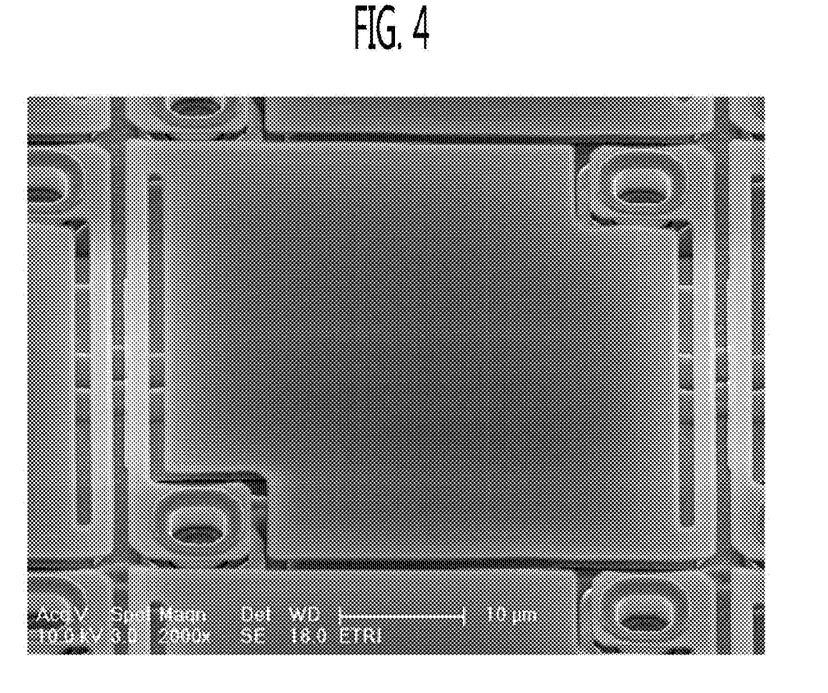
FIG. 4 is a scanning electron microscope (SEM) photograph of a bolometer for an IR detector manufactured according to an exemplary embodiment of the present invention.

A bolometer for an IR detector having a size of 50×50 μm² was manufactured by forming, on the substrate, a sacrificial layer 122 to a thickness of 2 μm using polyimide, first, second and third insulating layers 132, 140 and 144 to respective thicknesses of 100 nm, 50 nm and 50 nm using silicon nitride ($Si_3N_4$), auxiliary electrodes 34 to a thickness of 300 nm using Al, electrodes 136 to a thickness of 20 nm using titanium nitride (TiN), a resistor 142 to a thickness of 80 nm using an Sb thin film (sample No. 20) to which Ge was added. The manufactured bolometer was photographed by a scan-

TABLE 2

| | Sputtering Conditions | | | | Thin Film Properties | | |
|---|---|---|---|---|---|---|---|
| Sample No. | Gas flow (sccm) | Pressure (mTorr) | Temperature of Substrate (° C.) | DC Power (W) | Composition* (at %) | Resistivity ($\Omega \cdot$ cm) | TCR (%/K) |
| 11 | $N_2/Ar = 10/25$ | 3.4 | 300 | Sb/Ge = 100/25 | Sb:Ge:N = 82:11:7 | 7.46 | 2.48 |
| 12 | $O_2/N_2/Ar = 2/4/25$ | 3.1 | 25 | Sb/Ge = 100/25 | (Sb + O):Ge:N = 80:15:5 | 10.7 | 3.16 |
| 13 | $O_2/N_2/Ar = 6/12/25$ | 3.7 | 300 | Sb/Ge = 100/25 | (Sb + O):Ge:N = 81:14:5 | 43.0 | 3.20 |
| 14 | $O_2/N_2/Ar = 3/6/25$ | 3.2 | 25 | Sb/Ti = 100/25 | (Sb + O):Ti:N = 90:8:2 | 49.1 | 3.65 |
| 15 | $O_2/N_2/Ar = 2/4/25$ | 3.0 | 25 | Sb/Ti = 100/25 | (Sb + O):Ti:N = 90:6:4 | 5.92 | 3.37 |
| 16 | $O_2/Ar = 4/25$ | 2.9 | 25 | Sb/Ti = 100/25 | — | 1.98 | 2.95 |
| 17 | $O_2/Ar = 4/25$ | 2.9 | 25 | Sb/Ti = 75/75 | — | 19.7 | 3.30 |

*Due to attribute of an analysis method (XPS), amounts of Sb and O could not be measured individually, but only in total.

Embodiments 18 Through 23

Figure 5:
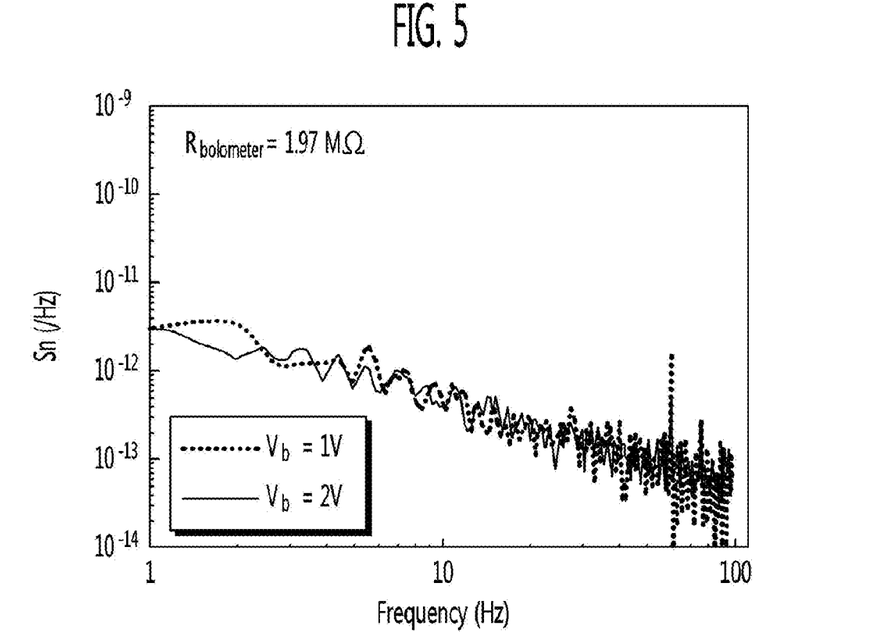
FIG. 5 shows results of measuring noise of a bolometer for an IR detector manufactured according to an exemplary embodiment of the present invention.

Sb-based thin films to which Ge was added were each deposited to a thickness of 80 to 150 nm on a silicon single crystal substrate, on which a silicon nitride ($Si_3N_4$) layer was formed to a thickness of 100 nm, and then resistivity and TCR properties were measured. The Sb-based thin films were deposited by co-sputtering injecting Ar gas into a chamber, and independently applying DC power to an Sb target and a Ge target. The properties of the thin films were examined according to co-sputtering conditions, and are arranged in Table 3 below ning electron microscope (SEM), and the result is shown in FIG. 4. Results measuring noise of the bolometer are shown in FIG. 5.

Figure 6:
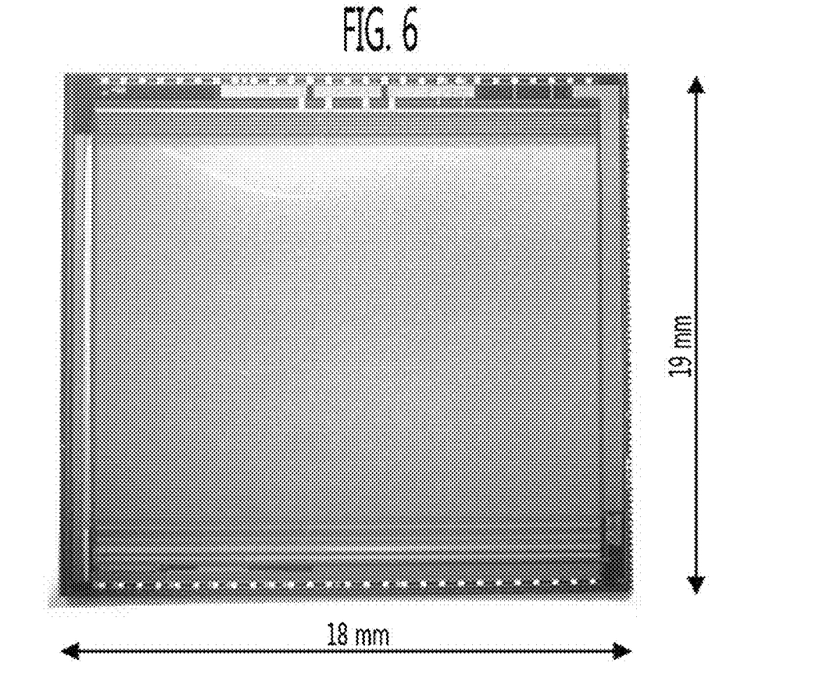
FIG. 6 is an optical microscope photograph of a chip for an IR detector, which has the resolution of a quarter video graphics array (QVGA) level and is manufactured by arranging bolometers according to an exemplary embodiment of the present invention in a 320×240 array.
Figure 7:
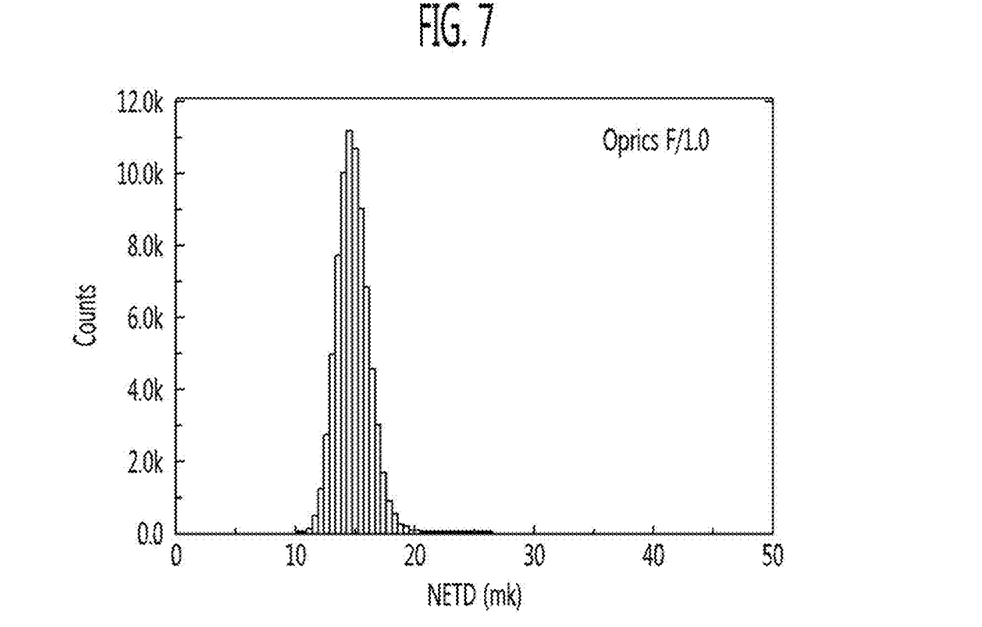
FIG. 7 shows results of measuring temperature precision of an IR detector having the resolution of a QVGA level manufactured using a chip in which bolometers according to an exemplary embodiment of the present invention are arranged in a 320×240 array.

Then, a chip for the IR detector having a resolution of a quarter video graphics array (QVGA) level was manufactured by arranging the bolometers in a 320×240 array, and was photographed by an optical microscope. The result is shown in FIG. 6. An IR detector of the QVGA level was manufactured by a typical method using the chip for the IR detector, and temperature precision was measured. The results of measuring the temperature precision are shown in FIG. 7.

TABLE 3

| | Sputtering Conditions | | | | Thin Film Properties | | |
|---|---|---|---|---|---|---|---|
| Sample No. | Gas flow (sccm) | Pressure (mTorr) | Temperature of Substrate (° C.) | DC Power (W) | Composition (at %) | Resistivity ($\Omega \cdot$ cm) | TCR (%/K) |
| 18 | Ar = 30 | 3.4 | 150 | Sb/Ge = 25/100 | Sb:Ge = 38:62 | 6.38 | 2.50 |
| 19 | Ar = 30 | 3.4 | 150 | Sb/Ge = 75/100 | Sb:Ge = 88:12 | 1.35 | 2.41 |
| 20 | Ar = 30 | 3.4 | 200 | Sb/Ge = 25/100 | Sb:Ge = 26:74 | 7.46 | 2.60 |
| 21 | Ar = 30 | 3.4 | 300 | Sb/Ge = 50/100 | Sb:Ge = 64:36 | 16.9 | 3.05 |
| 22 | Ar = 30 | 3.4 | 300 | Sb/Ge = 90/100 | Sb:Ge = 71:29 | 17.7 | 2.99 |
| 23 | Ar = 30 | 3.4 | 300 | Sb/Ge = 100/75 | Sb:Ge = 76:24 | 7.66 | 2.72 |

COMPARATIVE EXAMPLE

An a-Si thin film was deposited to a thickness of 150 nm using conventional PECVD on a silicon single crystal substrate, on which a silicon nitride ($Si_3N_4$) layer was formed to a thickness of 100 nm. In detail, the a-Si thin film was deposited on the substrate heated to 350° C. by injecting a mixture of 30 sccm of $SiH_4$ and 60 sccm of $PH_3$ into a chamber, adjusting a pressure to 1.2 Torr, and applying an RF power of 0.08 W/$cm_2$. Resistivity and TCR of the deposited a-Si thin film were measured, and the results were 30 Ω·cm and 2.4%/K.

Figure 8:
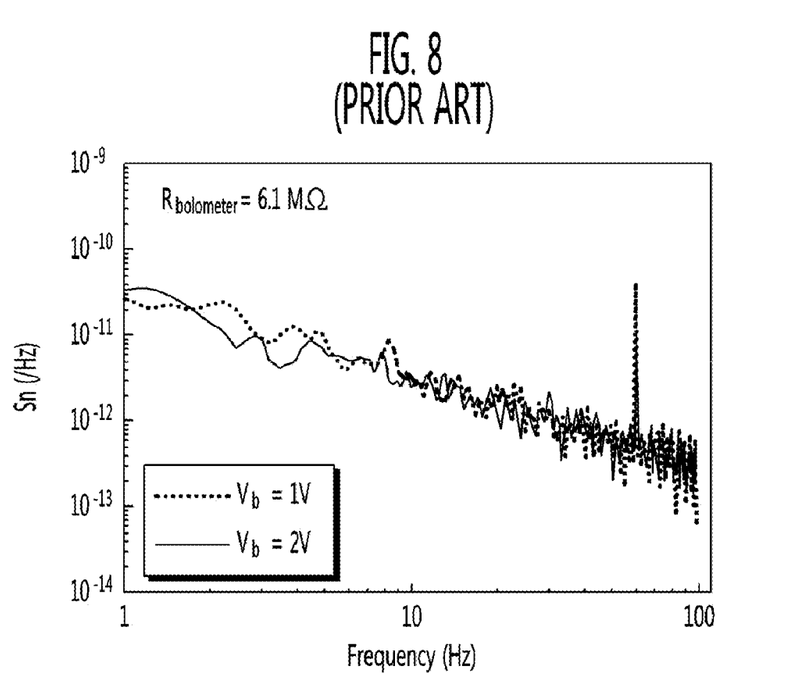
FIG. 8 shows results of measuring noise of a bolometer for an IR detector manufactured using a conventional a-Si thin film.

A bolometer for an IR detector having a size of 50×50 $\mu m^2$ was manufactured so as to be identical to that of Embodiment 24, except that the a-Si thin film having a thickness of 150 nm was used in place of the Sb thin film having a thickness of 80 nm as the resistor to which Ge was added. Noise of the manufactured a-Si bolometer was measured, and the results are shown in FIG. 8.

A chip for the IR detector having a resolution of a QVGA level was manufactured by arranging the a-Si bolometers in a 320×240 array, as in Embodiment 24. An IR detector of the QVGA level was manufactured by a typical method using the chip for the IR detector, and temperature precision was measured. The results of measuring the temperature precision are shown in FIG. 9.

Comparing Embodiments 20 and 24 with the Comparative Example, the TCR of the $Ge_{74}Sb_{26}$ thin film of the present invention is 2.6%/K, which is higher than the TCR of 2.4%/K of the conventional a-Si thin film. Further, a noise constant of the $Ge_{74}Sb_{26}$ thin film, i.e. a value corresponding to noise Sn when a frequency is 1 Hz in FIG. 5, is $3\times10^{-12}$, which is ten times lower than the noise constant of $3\times10^{-11}$ of the a-Si thin film shown in FIG. 8.

In this manner, it can be found that the inventive $Ge_{74}Sb_{26}$ thin film has a higher TCR and lower noise constant compared to the conventional a-Si thin film.

Figure 9:
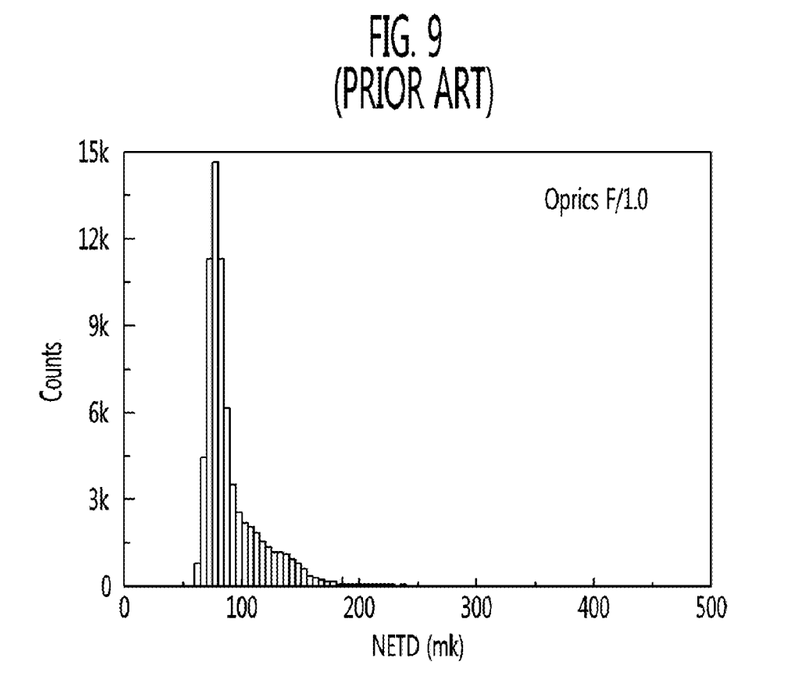
FIG. 9 shows results of measuring temperature precision of an IR detector having the resolution of a QVGA level manufactured using a chip in which bolometers using a conventional a-Si thin film are arranged in a 320×240 array.

As a result, it can be found that the IR detector of the QVGA level manufactured by the bolometers using the $Ge_{74}Sb_{26}$ thin film as the resistor has a temperature resolution, i.e. a noise equivalent temperature difference of FIG. 7, of 15 mK on average, which is higher than average of 85 mK when the a-Si thin film is used as the resistor (FIG. 9).

According to the present invention, a resistive material for a bolometer, in which at least one element selected from the group consisting of nitrogen (N), oxygen (O) and germanium (Ge) is included in antimony (Sb), has superior properties such as high TCR, low resistivity, a low noise constant, and is easily formed in a thin film structure by sputtering typically used in a complementary metal-oxide semiconductor (CMOS) process, so that it can be used as a resistor for the bolometer for an uncooled infrared detector, and thus provide the infrared detector with superior temperature precision.

In the drawings and specification, there have been disclosed typical exemplary embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A resistive material for a bolometer, in which at least one element selected from the group consisting of nitrogen (N), oxygen (O) and germanium (Ge) is included in antimony (Sb), and Sb is included at a concentration of 20 at. % or more.

2. The resistive material of claim 1, wherein the resistive material includes antimony nitride having a composition of SbNx ($0.03 \leq x \leq 0.25$).

3. The resistive material of claim 1, wherein the resistive material includes antimony oxide having a composition of SbOy ($0.02 \leq y \leq 0.15$).

4. The resistive material of claim 1, wherein the resistive material includes antimony oxynitride having a composition of SbNxOy ($0.02 \leq x+y \leq 0.25$).

5. The resistive material of claim 1, wherein the resistive material includes germanium antimony having a composition of GexSb ($0.1 \leq x \leq 0.8$).

6. The resistive material of claim 1, further comprising a transition metal at 30 at % or less.

7. The resistive material of claim 6, wherein the transition metal includes at least one selected from the group consisting of titanium (Ti), zirconium (Zr), hafnium (Hf), vanadium (V), niobium (Nb), tantalum (Ta), chromium (Cr), molybdenum (Mo), tungsten (W), manganese (Mn), iron (Fe), and cobalt (Co).

8. The resistive material of claim 1, wherein the resistive material further includes at least one material selected from the group consisting of antimony nitride having a composition of SbNx ($0.03 \leq x \leq 0.25$), antimony oxide having a composition of SbOy ($0.02 \leq y \leq 0.15$), antimony oxynitride having a composition of SbNxOy ($0.02 \leq x+y \leq 0.25$), and a transition metal at 30 at % or less.

9. The bolometer of claim 1, wherein the resistor further includes at least one material selected from the group consisting of antimony nitride having a composition of SbNx ($0.03 \leq x \leq 0.25$), antimony oxide having a composition of SbOy ($0.02 \leq y \leq 0.15$), antimony oxynitride having a composition of SbNxOy ($0.02 \leq x+y \leq 0.25$), and a transition metal at 30 at % or less.

10. A bolometer for an infrared detector, which comprises a resistor in which at least one element selected from the group consisting of nitrogen (N), oxygen (O) and germanium (Ge) is included in antimony (Sb), and Sb is included at a concentration of 20 at. % or more.

11. The bolometer of claim 10, wherein the resistor has a resistance of 0.1 MΩ to 10 MΩ, and a temperature coefficient of resistance (TCR) of 2%/K or more.

12. The bolometer of claim 10, wherein the resistor includes a thin film having a thickness of 50 nm to 100 nm.

13. The bolometer of claim 10, further comprising:
a semiconductor substrate in which a detection circuit is formed;
a reflective layer formed on a part of a surface of the semiconductor substrate;
metal pads formed on opposite sides of the reflective layer at a predetermined interval; and
a sensor structure having the resistor located at an upper portion of the semiconductor substrate and spaced apart from a surface of the reflective layer.

14. The bolometer of claim 13, wherein the sensor structure is a multiple layer having the resistor surrounded with a protection layer, and includes a body section located above the reflective layer, fixed sections mechanically and electrically connected to the metal pads outside the body section, and support arms connecting the body section with the fixed sections.

15. The bolometer of claim 13, wherein the sensor structure includes a protection layer, electrodes, and an absorbing layer formed on and under the resistor.

16. The bolometer of claim 15, wherein the protection layer is formed of silicon nitride ($Si_3N_4$).

17. The bolometer of claim 15, wherein the electrodes and the absorbing layer are formed of titanium nitride (TiN).

18. A method of manufacturing a bolometer for an infrared detector, the method comprising forming a resistor in which at least one element selected from the group consisting of nitrogen (N), oxygen (O) and germanium (Ge) is included in antimony (Sb), and Sb is included at a concentration of 20 at. % or more, in the shape of a thin film using sputtering.

19. The method of claim 18, further comprising:

forming a reflective layer on a part of a surface of a semiconductor substrate in which a detection circuit is formed, and forming metal pads on opposite sides of the reflective layer at a predetermined interval;

forming a sacrificial layer on a front surface of the semiconductor substrate, which includes the reflective layer and the metal pads, to a predetermined thickness;

forming a sensor structure having the resistor on the sacrificial layer; and removing the sacrificial layer.

20. The method of claim 18, wherein the sputtering is reactive sputtering applying direct current (DC) or radio frequency (RF) power or co-sputtering using an independent target.

* * * * *